US008285625B2

(12) United States Patent
Freund

(10) Patent No.: US 8,285,625 B2
(45) Date of Patent: Oct. 9, 2012

(54) SYNTHETIC FUNDS HAVING STRUCTURED NOTES

(75) Inventor: Peter C. Freund, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/212,277

(22) Filed: Aug. 18, 2011

(65) Prior Publication Data

US 2012/0005065 A1 Jan. 5, 2012

Related U.S. Application Data

(63) Continuation of application No. 12/554,139, filed on Sep. 4, 2009, now Pat. No. 8,036,973, which is a continuation of application No. 10/452,573, filed on Jun. 3, 2003, now Pat. No. 7,606,756.

(60) Provisional application No. 60/400,042, filed on Aug. 2, 2002.

(51) Int. Cl.
*G06Q 40/00* (2012.01)
(52) U.S. Cl. ......................... 705/36 R; 705/35
(58) Field of Classification Search ............... 705/36 R
See application file for complete search history.

(56) References Cited

U.S. PATENT DOCUMENTS

| | | | |
|---|---|---|---|
| 3,634,669 A | 1/1972 | Soumas et al. | 235/184 |
| 4,254,474 A | 3/1981 | Cooper et al. | 364/900 |
| 4,346,442 A | 8/1982 | Musmanno | |
| 4,355,372 A | 10/1982 | Johnson et al. | |
| 4,376,978 A | 3/1983 | Musmanno | |
| 4,597,046 A | 6/1986 | Musmanno et al. | |
| 4,598,367 A | 7/1986 | DeFrancesco et al. | 364/408 |
| 4,642,768 A | 2/1987 | Roberts | 364/408 |
| 4,674,044 A | 6/1987 | Kalmus et al. | |
| 4,736,294 A | 4/1988 | Gill et al. | 364/408 |
| 4,739,478 A | 4/1988 | Roberts et al. | 364/408 |
| 4,760,604 A | 7/1988 | Cooper et al. | 382/15 |
| 4,774,663 A | 9/1988 | Musmanno et al. | |
| 4,831,526 A | 5/1989 | Luchs et al. | 364/401 |
| 4,866,634 A | 9/1989 | Reboh et al. | 364/513 |
| 4,897,811 A | 1/1990 | Scofield | 364/900 |
| 4,972,504 A | 11/1990 | Daniel, Jr. et al. | |
| 5,041,972 A | 8/1991 | Frost | |
| 5,220,500 A | 6/1993 | Baird et al. | 364/408 |
| 5,227,874 A | 7/1993 | Von Kohorn | 358/84 |
| 5,231,571 A | 7/1993 | D'Agostino | 364/408 |
| 5,278,751 A | 1/1994 | Adiano et al. | 364/402 |
| 5,297,032 A | 3/1994 | Trojan et al. | |
| 5,444,844 A | 8/1995 | Inoue et al. | 395/161 |
| 5,481,647 A | 1/1996 | Brody et al. | 395/51 |

(Continued)

OTHER PUBLICATIONS

Sullivan, Deidre, Scoring Borrower Risk, Mortgage Banking, vol. 55, No. 2, pp. 94-98, Nov. 1994.

(Continued)

*Primary Examiner* — Kirsten Apple
(74) *Attorney, Agent, or Firm* — Goodwin Proctor LLP

(57) ABSTRACT

The present invention relates to synthetic funds for purchase by investors. A structured note is structured to provide customized equity returns/exposure. Terms of each structured note may be specified by the purchaser and the structured notes may be unsecured liabilities of the obligor, e.g., there are no underlying assets upon which the structure note is based. Thus, there will be no limits on the use of structured note proceeds and management of assets and liabilities will be left entirely to the obligor's discretion. Structured note payment obligations may be related to the performance of an objective valuation, but structured note holders will depend on the good credit of the obligor for payment.

23 Claims, 7 Drawing Sheets

U.S. PATENT DOCUMENTS

| | | | |
|---|---|---|---|
| 5,490,060 A | 2/1996 | Malec et al. | |
| 5,523,942 A | 6/1996 | Tyler et al. | 364/401 |
| 5,551,021 A | 8/1996 | Harada et al. | 395/600 |
| 5,583,778 A | 12/1996 | Wind | 364/464.01 |
| 5,592,590 A | 1/1997 | Jolly | 395/75 |
| 5,603,025 A | 2/1997 | Tabb et al. | 395/602 |
| 5,606,496 A | 2/1997 | D'Agostino | 395/235 |
| 5,611,052 A | 3/1997 | Dykstra et al. | 395/238 |
| 5,649,116 A | 7/1997 | McCoy et al. | 395/238 |
| 5,655,085 A | 8/1997 | Ryan et al. | 364/401 |
| 5,671,363 A | 9/1997 | Cristofich et al. | |
| 5,717,865 A | 2/1998 | Stratmann | 395/210 |
| 5,732,397 A | 3/1998 | DeTore et al. | 705/1 |
| 5,758,328 A | 5/1998 | Giovannoli | 705/26 |
| 5,765,144 A | 6/1998 | Larche et al. | 705/38 |
| 5,774,878 A | 6/1998 | Marshall | 705/35 |
| 5,774,883 A | 6/1998 | Andersen et al. | 205/38 |
| 5,802,502 A | 9/1998 | Gell et al. | 705/37 |
| 5,842,178 A | 11/1998 | Giovannoli | 705/26 |
| 5,870,721 A | 2/1999 | Norris | 705/38 |
| 5,873,096 A | 2/1999 | Lim et al. | |
| 5,875,437 A | 2/1999 | Atkins | 705/40 |
| 5,878,258 A | 3/1999 | Pizi et al. | |
| 5,878,403 A | 3/1999 | DeFrancesco et al. | 705/38 |
| 5,913,202 A | 6/1999 | Motoyama | 705/35 |
| 5,918,217 A | 6/1999 | Maggioncalda et al. | 705/36 |
| 5,920,848 A | 7/1999 | Schutzer et al. | 705/42 |
| 5,930,775 A | 7/1999 | McCauley et al. | 705/38 |
| 5,940,811 A | 8/1999 | Norris | 705/38 |
| 5,940,812 A | 8/1999 | Tengel et al. | 705/38 |
| 5,950,175 A | 9/1999 | Austin | |
| 5,963,953 A | 10/1999 | Cram et al. | 707/102 |
| 5,970,467 A | 10/1999 | Alavi | |
| 5,974,396 A | 10/1999 | Anderson et al. | |
| 5,978,779 A | 11/1999 | Stein et al. | |
| 5,987,434 A | 11/1999 | Libman | 705/36 |
| 5,995,942 A | 11/1999 | Smith et al. | |
| 6,009,415 A | 12/1999 | Shurling | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |
| 6,032,125 A | 2/2000 | Ando | |
| 6,044,371 A | 3/2000 | Person et al. | |
| 6,055,510 A | 4/2000 | Henrick et al. | |
| 6,070,147 A | 5/2000 | Harms et al. | |
| 6,078,892 A | 6/2000 | Anderson et al. | |
| 6,088,686 A | 7/2000 | Walker et al. | |
| 6,108,641 A | 8/2000 | Kenna et al. | |
| 6,173,270 B1 | 1/2001 | Cristofich et al. | |
| 6,188,993 B1 | 2/2001 | Eng et al. | |
| 6,199,077 B1 | 3/2001 | Inala et al. | |
| 6,202,053 B1 | 3/2001 | Christiansen et al. | |
| 6,249,775 B1 | 6/2001 | Freeman et al. | |
| 6,269,346 B1 | 7/2001 | Cristofich et al. | |
| 6,321,212 B1 | 11/2001 | Lange | |
| 6,338,047 B1 | 1/2002 | Wallman | |
| 6,502,080 B1 | 12/2002 | Eichorst et al. | |
| 6,601,044 B1 | 7/2003 | Wallman | |
| 2003/0229561 A1 | 12/2003 | Wallman | |
| 2009/0063363 A1 | 3/2009 | Present et al. | |

OTHER PUBLICATIONS

Jameson, Ron, Expanding Risk Management Strategies: Key to Future Survival, vol. 84, No. 5, Credit World, pp. 16-18, May 1996.

Friedland, Marc, Credit Scoring Digs Deeper into Data, Credit World, vol. 84, No. 5, pp. 19-23, May 1996.

Credit Scoring New Markets, Bank Technology News, vol. 9, No. 7, p. 1, Jun. 1996.

Carey, James J., The Sub-Prime Credit Market: Identifying Good Risks for Unsecured Cards vol. 85, No. 1, Credit World, pp. 13-15, Sep. 1996.

Opportunity Knocks at Scoring's Door, Collection & Credit Risk, vol. 2, No. 4, Apr. 1997.

Makuch, William J., Managing Consumer Credit Delinquency in the US Economy: A Multi-Billion Dollar Management Science Application, Interfaces, pp. 90-109, Feb. 1992.

Fred Fortner, There Must be a Better Way, Mortgage Banking vol. 53, No. 2, pp. 12-22, Nov. 1, 1992.

Jane B. Quinn, Credit issuers keeping a closer watch on how you pay bills, Washington Post, Apr. 25, 1988, Business Section P6.

International Search Report dated Dec. 15, 2003 for Application No. PCT/US03/20611.

Asch, Latimer, How the RMAIFair, Isaac credit-scoring model was built. Journal of Commercial Lending, vol. 77, No. 10, pp. 10-16, Jun. 1995.

Taylor, Clair et al., Card Issuers Turn to Scoring as They Face Increasing Risk, Financial Services Report, vol. 8, No. 15, p. 1, Jul. 24, 1991.

Roger, John C. et al., A Credit Scoring Model to Evaluate the Credit Worthiness of Credit Card Applicants, Developments in Marketing Science, vol. 5, 1982.

Hickman, Michael, Using Software to Soften Big-Time Competition, Bank Systems & Technology, vol. 31, No. 8, pp. 38-40, Jun. 1994.

Hedge Fund Primer—Online Education About Hedge Funds, "Hedge Fund Primer—The Basics," 18 pages, Jul. 24, 2002.

Frank Armstrong, "Fund of Funds: Perfect Solution or Dangerous Shortcut?," Investor Solutions, Inc., <www.investorsolutions.com>, pp. 1-3, Jul. 24, 2002.

Hedge Fund Primer, About Fund of Funds, HedgeFund.net—hedge fund primer, 2 pages, Jul. 24, 2002.

Why a Fund of Funds?, <http://www.managedinvestments.com/hedge_fund_of_funds.html>, Jul. 24, 2002.

Structured Notes, The Turin Group-Financial Services, Trading and Capital-Markets Activities Manual, pp. 1-14, Jul. 24, 2002.

Derivatives Study Center: Primer on Derivatives Instruments, "Primer: Derivatives Instruments," pp. 1-8, Jul. 24, 2002.

Farzin Pourmokhtar, "Ahedge fund printer, version 0.1," <http://www.emf.net/~farzin/hedgefund.html>, pp. 1-5, Jul. 24, 2002.

Gregory Zuckerman, "The Hedge-Fund Craze", The Wall Street Journal Online, Jun. 12, 2002, pp. 5-6. WSJ.com.

"Fidelity helps fund sellers trim the taxes they'll owe," The Wall Street Journal Online, Nov. 7, 2002, 2 pages, (author unknown).

Ian McDonald, "The stars in the sky flicker, and fund stars do the same," The Wall Street Journal, Jan. 15, 2003, 3 pages, Top-rated funds are kind of like . . . www.business.auburn.edu/~hinkech/notes5.pdf—Similar pages.

"Huddling With William Bernstein: Small Town Doctor, Investing Pro," The Wall Street Journal, 4 pages, (author unknown).

"Harsh Truth: Your Investments Likely Won't Make Any Money," The Wall Street Journal, 2 pages, (author unknown).

John C. Bogle, "Mutual Funds at the Millennium: Fund Directors and Fund Myths," May 15, 2000, 15 pages.

Erica Goode, "On Profit, Loss and the Mysteries of the Mind," Nov. 5, 2002, The New York Times, <nytimes.com>, 4 pages.

K.S.P. "Hedge Fund Primer, Frequently Asked Questions", dated Jul. 24, 2002, http://www.kspcapital.com/primer/faq1.htm, 11 pages.

Federal Reserve Bank of Chicago, Product Summary, Structured Notes, Nov. 1994, 24 pages.

Hedge Fund Strategies: A Primer (canadianhedgewatch), pp. 3.

CIEBA (Committee on Investment of Employee Benefit Assets), Derivatives Primer, Dec. 2001, Association for Financial Professionals, <www.AFPonline.org>, pp. 1-11.

SYNTHETIC FUNDS HAVING STRUCTURED NOTES

PRIORITY

This application claims priority to patent application Ser. No. 12/554,139 filed on Sep. 4, 2009, which is a continuation of application Ser. No. 10/452,573 filed on Jun. 3, 2003, which claims priority to provisional application No. 60/400,042 filed on Aug. 2, 2002, all of which are incorporated herein by reference in their entirety.

FIELD OF THE INVENTION

The present invention relates generally to investing, and more particularly, to a structured investment vehicle that provides superior returns while reducing costs to investors.

BACKGROUND OF THE INVENTION

Mutual funds were developed to give less affluent people the benefits of diversification and access to the expertise of sophisticated asset managers. Index funds emerged with the promise of much reduced transactions costs, and improved tax efficiency. The tax efficiency arises from the fact that index funds trade infrequently, giving individual investors the power to decide when to take gains and losses. Notwithstanding substantial academic evidence that index fund returns exceed the long-term performance of the vast majority of managed funds, a very large percentage of retail equity assets are still invested in managed funds.

Virtually all retail equity investments are based directly or indirectly on specific portfolios of stock. Consumers own stocks directly, and mutual funds invariably pass-through (after deduction of fees) investment returns of stocks bought for the fund. This pass-through structure is very capital efficient for asset managers. Mutual fund investors buy shares in specific assets that are protected by trustees/custodians. So long as the manager does not abuse his or her fiduciary obligations, the sole claim of investors is against pledged assets. Investors do not expect to be protected by the balance sheet of fund managers. Though the mutual fund industry has produced very good returns for fund managers, there is reason for concern that individual investors have fared far less well.

One investment vehicle that has exploded in popularity during the early 2000's is the so-called "hedge fund." While the term is applied broadly, and sometimes indiscriminately, the term "hedge funds" generally refers to private investment limited partnership vehicles run by managers who are compensated primarily based on performance, rather than based on fixed fees or a fixed percentage of the assets under their management. Often, hedge fund managers have a personal stake in the assets. Typically, the hedge fund manager is a general partner in the partnership and, the investors are limited partners. Typically, the strategy is set out in and governed by the partnership agreement created for the fund.

Unlike conventional funds (like mutual funds) which are limited to a single asset type (e.g., equities), hedge funds may broadly utilize various asset types and various strategies for managing those asset types. The asset types may include equities, bonds, currencies, precious metals, commodities, and so forth. The investment instruments may include conventional stock purchase, options, futures, and the like. The strategies may include long positions, short positions, hedging, leverage, derivatives, arbitrage and the like, and combinations of the aforementioned.

The point of hedges is that the assets and the strategies are selected by the fund manager according to any appropriate mix—a mix that will change as economic conditions change—to achieve good absolute returns. The concept of absolute returns is key in hedge fund theory. This is because the goal is not to outperform any particular market or index, but the goal is to provide a good absolute return irrespective of any particular market or index. This makes sense because the hedge fund may reallocate its assets, instruments, and strategies to avoid the downturns or limitations of any particular market or index.

Generally, hedge funds will compensate their managers based on a portion of profits, such as quarterly or annually. Fees of 15% or 30% of profits (so-called "performance fee") are not uncommon. A fee for fund management expenses (so-called "management fee") is typically charged to cover the manager's expenses, typically about 1-3% of the funds invested. To the extent the fund manager has a personal stake in the funds, he is compensated in that regard as well for any growth. Therefore, the other key aspect of hedge funds that distinguishes them from conventional investment vehicles is the incentive-based compensation for the manager. This is in contrast to conventional brokerages which are compensated based on transaction fees unrelated to performance. Thus, hedge funds eliminate the motivation to "churn."

The investment strategies charted by hedge fund managers vary greatly. Although the name "hedge funds" suggests that they employ hedging strategies, this is not always the case. Those that employ hedging may use risk mitigation strategies by selecting an element of the market (e.g., it could be a sector such as telecommunications, or it could be the entire market), and then designing their investment strategy to invest in that element of the market while minimizing risk from investment cycles. For example, a hedge fund manager whose fund is based on utility stocks may broadly purchase equities in that sector, while also acquiring "put" options to sell should that sector slump.

The goal of many hedge funds is to have a zero "beta" relative to the broader equities market. In other words, the hedge fund's performance is preferably unrelated to the market's performance, i.e., it is "market neutral." This can be accomplished in various fashions. One common strategy is so-called "pairs trading," where the fund's manager seeks to buy and sell equities in pairs, the buy being for a relatively undervalued stock (relative to the rest of that sector) and the sell being for a relatively overvalued stock. Implementation of hedging using such strategies not only favors the investors in those hedge funds, but the overall market benefits by becoming more liquid as a result of the capture of the spread in the market.

Another characteristic of hedge funds is that they are usually private (largely unregulated by the SEC) and, therefore, cannot advertise. Members (investors) must be accredited and the number of investors generally cannot exceed ninety-nine. Generally, an accredited investor must have a net worth greater than $1 million and/or an annual income exceeding $200,000. These limitations limit participation in hedge funds to a relatively small body of fairly affluent investors. As a result, the typical investors in hedge funds are accredited individuals, institutions, endowments, fund-of-funds, family offices, and pensions.

Another investment concept that has found popularity in recent years is the so-called "fund-of-funds." A fund-of-hedge funds may be a fund, such as a mutual fund, that invests in hedge funds. Or a fund-of-funds may be a fund that holds several classes of assets, such as stocks and bonds. Generally, the fund-of-funds interests are issued as shares that correlate to the underlying assets. Generally, a fund-of-funds is run by a manager who can be viewed as managing the managers associated with the underlying funds.

Fund-of-funds are often implemented as a means to invest in multiple hedge funds. Because of their high minimums and other restrictions, the average investor cannot invest in multiple hedge funds. A fund-of-funds, however, can be set up that invests in various hedge funds without requiring a substantial investment for each investor. The manager of the fund-of-funds, therefore, can diversify risk among the multiple managers of the underlying hedge funds. Generally, fund-of-funds managers select the funds to diversify strategy, although not always. For example, a strategy specific fund-of-funds might be a fund of market neutral funds that only invests in market neutral funds.

Much of the money entering the hedge fund market has been invested via portfolios of many hedge funds selected by an experienced asset manager, i.e., the fund-of-funds instrument discussed above. These fund-of-funds offer investors experienced management and diversification across many different hedge fund strategies. Though the fund-of-funds impose an additional layer of expenses, market volatility can be damped significantly. It is believed that institutions own 80% of fund-of-funds assets.

For a large institution wishing to enter the fund-of-funds business, there are several options for entering the fund-of-funds market. First, the fund-of-funds capability could be built internally. For example, in the case of a large bank, the accounting and back office functionality is already available. Large banks have good track records in hedge fund performance, although this performance may not be established with third parties. Therefore, while a bank might be able to effectively market its track record to "retail" (smaller investors), large institutional investors are more likely to choose managers with more experience. Another potential drawback to this approach is that developing a track record satisfactory to institutions can take years.

Another option to enter the fund-of-funds market would be to partner with a recognized fund manager. This approach may be effective for capturing retail business. In this case, a bank may earn the distribution premium, retain the assets, and limit its initial costs/risks. However, this partnering approach may not be effective with institutional investors because they can go directly to the fund-of-funds managers. In the eyes of institutional investors, a bank may not be adding sufficient value in this scenario to justify the added costs.

Yet another option would be to simply buy a fund-of-funds business. However, prices are currently very high. For example, recent prices for fund-of-funds typically amount to 10% of assets. Only exceptional continued growth will justify such high prices.

Some mutual funds advertise that they focus on tax efficiency. Usually, this means that they try to reduce turnover, and invest for longer term. While generally benefiting long-term investors, this strategy does not avoid the tax pass-through risk for short-term investors. In addition, placing any constraint on trading means that the manager cannot optimize his cash returns.

At substantial cost, Fidelity recently announced it would enable its mutual fund shareholders greater ability to manage their taxes, by permitting them to sell specific shares previously purchased. While of potential value to a minority of investors, of greater moment to most investors is the unpredictable pass-through to shareholders of gains and losses recognized by mutual funds as fund managers trade securities.

Other drawbacks may also be present.

SUMMARY OF THE INVENTION

Accordingly, one aspect of the invention is to address one or more of the drawbacks set forth above.

Another aspect of the present invention is to provide investment opportunities that track conventional asset-based investments (e.g., hedge funds, fund-of-funds, mutual funds, etc.) without requiring the synthetic funds manager/obligor to purchase the underlying asset.

A further aspect of the invention is to provide investments, described as structured notes (which may include saps, derivatives, contracts, trusts, and other types of investments), with features and options that to date have typically only been available to institutional investors.

An additional aspect of the invention is to provide consumers/brokers the ability to: structure notes in real time, with tradable pricing/values; review how the notes would have performed during different historical periods; select features and options that optimize the investor's goals based on their risk/utility function and outlook; execute and memorialize the trade immediately without risk of rekeying errors or other human mistakes.

By way of an exemplary embodiment of the invention, a process for creating and issuing a synthetic fund with an unsecured structured note comprises receiving a request to purchase at least one structured note, where the request comprises an amount of the at least one structured note and at least one term of the at least one structured note, generating the at least one structured note based on the request, receiving payment for the at least one structured note, and issuing the at least one structured note, where the at least one structured note is an unsecured liability of the obligor.

By way of a further exemplary embodiment of the invention, a process for creating and issuing a synthetic fund comprises receiving a request to purchase at least one structured note, where the request comprises an amount of the at least one structured note and at least one term of the at least one structured note, where the at least one term of the note includes a valuation of the at least one structured note based on at least one objective valuation measure and a time period for redeeming the at least one structured note, generating the at least one structured note based on the request, receiving payment for the at least one structured note, and issuing the at least one structured note, where the at least one structured note is an unsecured liability of the obligor.

According to another aspect of the invention, a process for creating and issuing a synthetic fund comprises receiving a request to purchase at least one structured note, where the request comprises an amount of the at least one structured note and at least one term of the at least one structured note, where the at least one term of the note includes: a) a valuation of the at least one structured note based on at least one objective valuation measure, where the valuation is based on the at least one objective valuation measure without a predetermined amount of fees associated with the objective evaluation measure and a time period for redeeming the at least one structured note, where the valuation of the at least one structured note is based in part on the time period for redeeming the at least one structured note, generating the at least one structured note based on the request, receiving payment for the at least one structured note, where the payment for the structured note is based on the objective valuation measure at the time of the payment, and issuing the at least one structured note, where the at least one structured note is an unsecured liability of the obligor.

Another exemplary aspect of the invention provides a synthetic fund for purchase as a financial product comprising a structured note issued by an obligor, where the structured note is an unsecured liability of the obligor, and the structure note comprises at least one term, where the at least one term includes a valuation based on at least one objective valuation measure.

By way of a further exemplary embodiment of the invention, a synthetic fund for purchase as a financial product comprises a structured note issued by an obligor, where the structured note is an unsecured liability of the obligor, and the structure note comprises at least one term, where the at least one term includes a valuation based on at least one objective valuation measure and a time period for redeeming the at least one structured note, where payment for the structured note is based on the objective valuation measure at the time of the payment.

According to an additional exemplary aspect of the present invention, A synthetic fund for purchase as a financial product comprises a structured note issued by an obligor, where the structured note is an unsecured liability of the obligor, and the structure note comprises a plurality of terms comprising a valuation based on at least one objective valuation measure without a predetermined amount of fees associated with the objective evaluation measure and a time period for redeeming the at least one structured note, where the valuation of the at least one structured note is based in part on the time period for redeeming the at least one structured note, and where payment for the structured note is based on the objective valuation measure at the time of the payment.

By way of a further example of the present invention, a system for issuing a structured note for a synthetic fund, the system comprises a request module for receiving a request to purchase the structured note, a generating module for generating the structured note, a purchase module for receiving payment to purchase the structured note, and an issuing module for issuing the structured note in response to the request, where the structured note is an unsecured liability of the obligor.

An additional embodiment of the invention provides a system for issuing a structured note for a synthetic fund. The system comprises a request module for receiving a request to purchase the structured note, where the request comprises the terms of the structured note and the amount of purchase, and where the terms of the at least one structured note further comprise the valuation of the structured note and a time period for redeeming the at least one structured note, a generating module for generating the structured note, where the generating module generates a unique identifier for the structured note and where the purchaser has an identifier, an purchase module for receiving payment to purchase the structured note, an issuing module for issuing the structured note in response to the request, where the structured note is an unsecured liability of the obligor and a storage module, where the storage module stores and links the unique identifier for the structured note and the purchaser identifier.

According to a further exemplary embodiment of the invention, a system for issuing a structured note for a synthetic fund comprises means for receiving a request to purchase the structured note, means for generating the structured note, means for receiving payment to purchase the structured note, and means for issuing the structured note in response to the request, where the structured note is an unsecured liability of the obligor.

By way of a further example, a system for issuing a structured note for a synthetic fund comprises means for receiving a request to purchase the structured note, where the request comprises the terms of the structured note and the amount of purchase, and where the terms of the at least one structured note further comprise the valuation of the structured note and a time period for redeeming the at least one structured note, means for generating the structured note, where the generating module generates a unique identifier for the structured note and where the purchaser has an identifier, means for receiving payment to purchase the structured note, means for issuing the structured note in response to the request, where the structured note is an unsecured liability of the obligor and means for storing and linking the unique identifier for the structured note and the purchaser identifier.

A further exemplary embodiment provides a computer readable medium for causing a process to issue a structured note for a synthetic fund comprising code for receiving a request to purchase the structured note, code for generating the structured note, code for receiving payment to purchase the structured note and code for issuing the structured note in response to the request, where the structured note is an unsecured liability of the obligor.

According to a further example of the present invention, a computer readable medium for causing a processor to issue a structured note for a synthetic fund comprises code for receiving a request to purchase the structured note, where the request comprises the terms of the structured note and the amount of purchase, and where the terms of the at least one structured note further comprise the valuation of the structured note and a time period for redeeming the at least one structured note, code for generating the structured note, where the generating module generates a unique identifier for the structured note and where the purchaser has an identifier, code for receiving payment to purchase the structured note, code for issuing the structured note in response to the request, where the structured note is an unsecured liability of the obligor, and code for storing and linking the unique identifier for the structured note and the purchaser identifier.

DETAILED DESCRIPTION OF THE INVENTION

A system and process for synthetic funds is described. The system and process make use of existing funds to provide investment opportunities in structured notes. One technical effect of the invention is to provide a system and process for issuing a structure note for a synthetic fund for investment purposes. Various aspects and components of this system and process are described below. While the present invention is described in terms of structured notes issued by an obligor, it is recognized that swaps, derivatives, contracts, trusts and other types may also be used, individually or in combination, as the basis for synthetic funds.

Generally, a structured note, such as within a synthetic mutual fund structure, may replace thinly capitalized fund managers with an issuer (also referred to as an "obligor"). According to an embodiment of the invention, an obligor may be a credit-worthy structure note issuer supported by substantial balance sheets. Instead of buying shares in a mutual fund, an investor may purchase one or more notes, structured to provide customized equity returns/exposure (also referred to as "structured notes"). Terms of each structured note may be specified by the purchaser. According to an embodiment of the invention, structured notes may be unsecured liabilities of the obligor, e.g., there are no underlying assets upon which the structure note is based. Thus, there will be no limits on the use of structured note proceeds and management of assets and liabilities will be left entirely to the obligor's discretion. Structured note payment obligations may be related to the performance of an objective valuation, but structured note holders will depend on the good credit of the obligor for payment. Various features and aspect of structured notes will now be described in greater detail below. According to an embodiment of the invention, a value in selling structured note may occur in that the obligor receives the cash from the purchaser. This provides the purchaser with the ability to leverage a position, enter a short position, take certain risks, use a derivative, provide a credit risk on an institution, or other actions. Use of a structured note may avoid the use of collateral and margin calls when a purchasers position becomes strongly negative.

Figure 1:
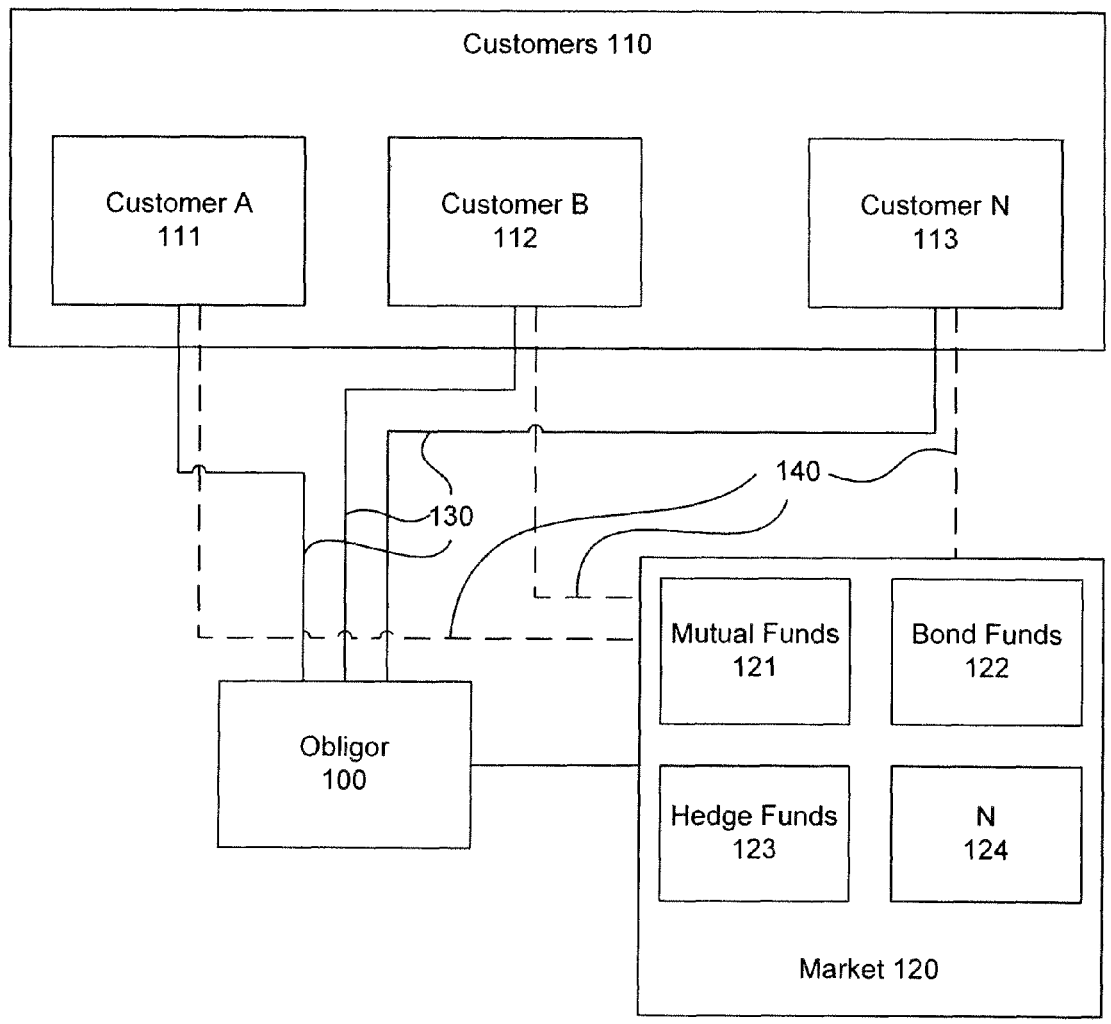
FIG. 1 illustrates the relationship between an obligor, the market and one or more customers according to an embodiment of the invention.

FIG. 1 illustrates the relationship between an obligor, the market and one or more customers (hereinafter also referred to as "purchasers," "investors," "consumers," and "users") according to an embodiment of the invention. Obligor 100 is in communication with one or more customers 110. In the relationship illustrated in FIG. 1, customers 110 are illustrated as customer A 111, customer B 112 through customer N 113, where N is a whole number. It will be recognized that various numbers and types of customers may be involved.

Market 120 comprises the entire market of objective valuation measures and their underlying assets. By way of example, mutual funds 121, bond funds 122 and hedge funds 123 are illustrated. However, it will be appreciated that market 120 represents the entire world of objective valuation measures and their underlying assets, and includes other assets.

As illustrated in FIG. 1, investors 110 are in direct contact with obligor 100, as illustrated by lines 130. Investors 110 are further in indirect contact with market 120, illustrated by dashed lines 140. According to an embodiment of the invention, investors 110 indirectly contact market 120 via receipt of information about the market. By way of example, values of mutual funds, bond funds, hedge funds, individual stocks, bonds, real estate and commodities and other assets in the market are often published in newspapers and on the internet. Further, many funds advertise their valuations in the hopes of attracting new investors. Thus, investors 110 may indirectly contact various aspects of market 120 to determine what investments they desire.

Investors 110 may directly contact obligor 100 to purchase a structured note based on one or more objective valuation measures within market 120. For example, investor 111 directly contacts obligor 100 and requests to purchase a structured note. In this example, investor 111 may request that the structured note be value based on a bond fund 122 objective valuation measure. In response to this request, obligor 100 issues the structured note. Further, obligor may then directly contact market 120 to purchase the underlying assets associated with objective valuation measure.

According to an embodiment of the invention, an obligor may manage the structured note liability very efficiently. On an aggregated basis, structured notes may represent a large and diversified portfolio of exposures. The vast bulk of the exposure may be captured by generic indices. By way of example, when stock and mutual funds are used as an objective valuation measure, structured notes may represent a large and diversified portfolio of equity exposures. The exposure may be then captured by generic equity indices, e.g., the "Standard & Poor 500"® index, the "Wilshire 5000"® index, the "Russell 2000"® index, etc. Further, the risk may be hedged in a number of standard ways, using stocks, futures or derivatives. As the dominant index risk will change slowly and turnover will be low with index funds, transaction costs for the obligor will be reduced.

There may be some basis risk between the aggregated structured note exposure and any combination of objective market measures. However, the obligor generally will have periodic snapshots (e.g., quarterly, semi-annually, etc.) of the actual holdings of every objective measure. By way of example only, a mutual fund may make semi-annual or quarterly reports publicly available of its holdings. The obligor can reduce its tracking error to an arbitrarily small number by adjusting: the bulk index hedge; sector index hedges; individual stocks or other underlyings (securities, funds, etc.); the cash position; the weighting of small capitalization share holdings as compared to large capitalization share holdings, etc.

According to an embodiment of the invention, structured note holders may shape the risk and return of an investment (by introduction of option or other derivative characteristics) in a manner previously only available to institutional investors. Thus, structured note purchasers can, by selecting various parameters for the structured note, individualize the investment in the same manner as afforded institutional investors.

Managing option exposures is a scale business, which may be made easier when the options are quite diverse (e.g., many different strike levels and maturities). Obligors may very efficiently offer structured note holders great flexibility in customizing their risk profiles. Risk management of the options embedded in structured notes may be simplified. Option traders are most concerned about heavily concentrated option exposures, which is not a concern regarding retail structured note investors. By their nature, structured note options are likely to be very diversified.

Structured note obligations may be crystallized by objective valuation measures, such as specific, publicly available market values. Careful definition of those critical market values may be required in order to avoid the risk of exposing an obligor to arbitrage by third parties, while enabling investors and an obligor to know precisely the terminal value of their synthetic funds investment.

The business of issuing structured notes is a business that can easily be institutionalized. Managing structured note liabilities is very straightforward. Obligors need not pay extravagant fund manager salaries or exorbitant premiums to buy asset management firms. Further, obligors may become the low cost producer in asset management due to lower marketing expense (piggy-back on mutual fund ads), cheaper issuance, lower administrative and accounting fees, smaller transaction costs, etc. An obligor's incremental regulatory overhead may also be less than the regulatory overhead for many mutual funds is substantial.

To be economically feasible, mass customization of structured notes may require substantial automation. Fortunately, the required technology is not difficult to implement. The obligor may make available an application for structuring, pricing, and comparing different structured note to various parties, such as to customers online, and to its brokers. Pricing parameters may be established centrally, taking account for all aspects of each structured note, including, but not limited to current market conditions (e.g., yield and volatility curves, and bid/asked spreads), historical information (e.g., volatility for each fund, and covariance versus other funds), the risk in the portfolio (e.g., does the structured note increase or decrease the risk in the portfolio) and transaction costs.

Execution and documentation of structured notes may also be fully electronic. Further, an obligor may also provide an application for showing bids for structured notes that are not currently redeemable.

The obligor is likely to be able to accumulate assets relatively inexpensively. Because obligor's cost structure may be lower, obligor will have the option to offer a higher return on structured notes than any underlying fund. Various other financial service providers, such as Merrill Lynch and Schwab Investments, have demonstrated the value of offering a broad range of investment vehicles. However, in the present invention, obligors can offer a broader range of fund products than any fund distributor. Obligors need not seek approval from fund managers in order to reference one of their managed funds in a structured note. Instead of merely earning a distribution premium, obligors will earn the full value provided to investors. Further, mass customization is desirable in many retail settings. At a tiny incremental operating cost, obligors can instantly offer investors unprecedented and unparalleled customization choice.

Shares in an equity mutual fund are never fully invested in stock. Mutual funds are usually around 90% equity and 10% cash. Without other resources to accommodate unexpected redemptions, mutual funds must retain substantial cash reserves. In a rising market, these cash reserves constitute a drag on fund returns. Issuers of structured notes will have many more options for dealing with redemptions. Obligors are very unlikely to retain specific cash reserves.

Figure 2:
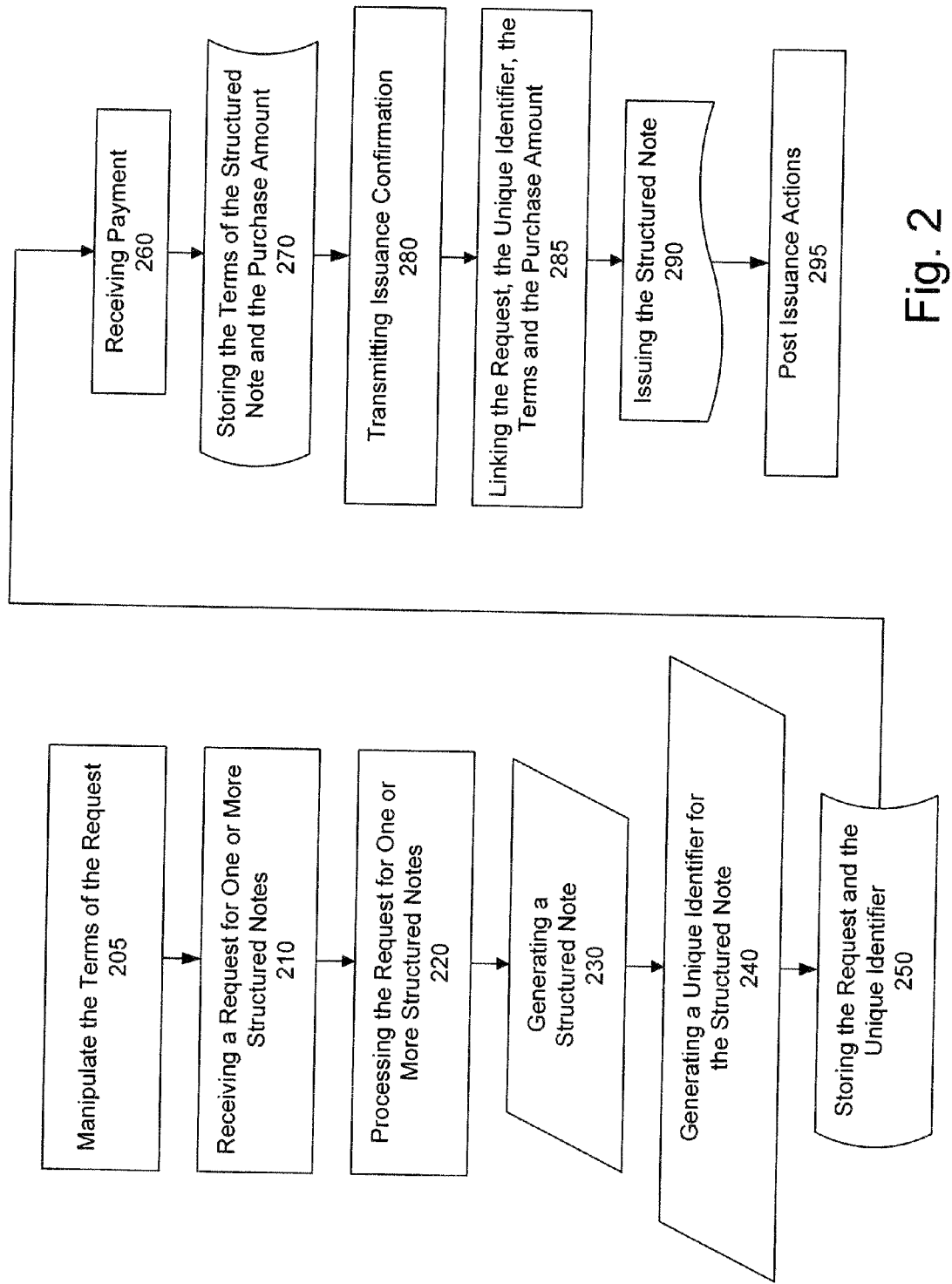
FIG. 2 illustrates a process for generating and issuing a structured note according to an embodiment of the invention.

FIG. 2 illustrates a process for generating and issuing a structured note according to an embodiment of the invention. At step 205, manipulation of the terms of a request is performed. At step 210, a request for one or more structured notes is received. At step 220, the request is processed, and one or more structured notes are generated at step 230. At step 240, a unique identifier for each structured note is generated. The identification of the requestor and the unique identifier are stored at step 250. At step 260, payment is received for the purchase of the structured note. At step 270, the terms of the structured note and the purchase amount are stored. An issuance confirmation is transmitted at step 280. At step 285, the unique identifier, the purchaser name, the terms of the structured note and the purchase amount are linked together. At step 290, the structured note is issued. At step 295, post issuance actions occur. The steps of the process illustrated in FIG. 2 will now be described in greater detail below.

At step 205, manipulation of the terms of a request is performed. According to an embodiment of the invention, a consumer may be permitted to manipulate one or more terms for a structured note prior to purchase. This manipulation of the terms allows a consumer to customize the structured note to meet the consumers' specific investment needs. Either alone or with the assistance of a broker or other financial advisor, a consumer may use a simulator to manipulate tears of a structured note to determine changes in prices based on various terms, such as by using different combinations of funds, different time frames, different risk exposures, etc. According to an embodiment of the invention, an optimization tool may be provided for use by the broker and/or the consumer. By way of example, a consumer may provide various information about a desired structured note, such as the funds selected as the basis, the distribution of the funds, the investment goals of the consumer and the time period for the structured note. Other information and selections may also be used. The optimization tool then generates a proposed structured note optimized to meet the objectives selected by the consumer.

Another aspect of the present invention is a method to permit potential buyers of structured note, investment advisors and brokers to iterate on different note structures to find the optimal combination of features for the individual investor. Such a method would involve a network of computer devices connected to a central server controlled by the obligor. Software on the access devices and the server would permit users of the system to search among many funds to find those with the characteristics desired by the potential investor. The system would then permit the user to alter characteristics of the returns of the fund, by changing terms of the note including: amount; term; coupon; early redemption options; 'free exchange' options; leveraging exposures; adding or subtracting exposures to other funds, stocks, indices, etc.; option characteristics, e.g. principal protection or incremental yield for giving up a portion of the potential upside; etc.

The system would be linked to market parameters provided by the obligor, which would permit users to see immediately the impact of each change on various aspects of the note. The obligor would be able to centrally provide the necessary inputs to price each note based on market parameters. For example, a user may determine how much incremental yield would be provided if the note holder forgoes returns in excess of 10%. This would permit real-time pricing and sale of notes, without the need to involve traders or other risk managers.

The system would also permit users to test the newly structured note to review its performance over different historical time frames, in bull markets and bear markets. For example, a user may determine how would a newly structured 3-year note have performed, versus a simple purchase of the underlying fund, during the period 1997-2000. The system would permit users to compare total returns, including the impact of taxes, at the potential investor's tax rate. The system can also generate tradable note provisions, e.g., pricing and provisions that the obligor considers acceptable.

Further, the system would be structured to take inputs from users regarding an individual note and immediately prepare the necessary detailed legal documentation for the customized note. Once the investor chooses to execute the purchase of a structured note, the transaction will automatically be included in the obligor's risk systems, recorded in the obligor's books and records; and, all necessary confirmation and other legal requirements would be executed.

According to an embodiment of the invention, a system may include a database with information on funds used as the objective valuation measure in the structured note, past performance of the funds, managements fees, advertising fees, etc. A processor accesses the database and processes selections of options for terms of the structured notes, determining historical returns and pricing.

Figure 6:
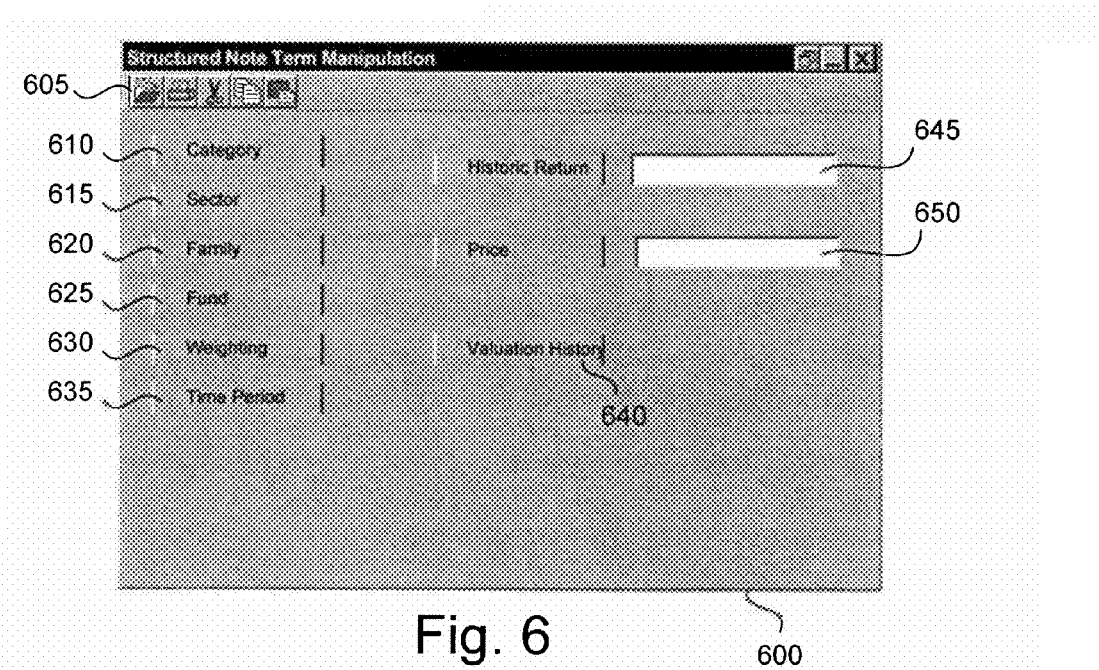
FIG. 6 illustrates a graphic user interface for manipulating terms according to an embodiment of the invention.

According to an embodiment of the invention, a graphical use interface may be provided to enable a consumer, broker or financial advisor to manipulate the terms of the structured note before purchase a purchaser may call up, historical data to analyze how a particular structured note would have fared in a particular economic environment. In addition, a purchaser may call up pricing information such as, but not limited to, the volatility curve and the yield curve, distributed across all structuring intervals. FIG. 6 illustrates a graphical user interface for manipulating terms according to an embodiment of the invention. In the example illustrated in FIG. 6, the manipulation of the teens of the structured note is provided in an internet environment. However, it is understood that the manipulation may occur in other mediums and/or networks as well. Graphical user interface 600 includes a standard menu 605 that enables a user to navigate within the website.

Graphical user interface 600 also includes portions to select information about that terms of the structured note. As illustrated in the example of FIG. 6, these portions are in the form of pull down menus. However, it is recognized that other manners of enabling a user to select information about the terms of the structured note may also be used. At portion 610, a user may select the category of the one or more objective valuation measures to be used. Categories may include the specific bond fund, the specific mutual fund, the specific hedge fund, the specific commodity or any other objective valuation measure to be used in connection with the structured note. Portion 615 may enable a user to select the sector of the one or more objective valuation measures to be used. Sectors may include, but is not limited to, the area of the market (e.g., financial services, technology, energy, telecommunications, transportation, etc.) and the goal of the fund chosen (e.g., large capitalization, small capitalization, aggressive, growth and income, etc.).

Portion 620 enables a user to select a family of funds. Many fund management companies, such a mutual funds, offer a number of different funds to consumers. For example, Fidelity Investments provides tens of fund options to consumers. Thus, using portion 620, a consumer may select a fund family, and then be presented with options provided by that fund family in portion 625. This may also be used with bond funds, hedge funds, commodity funds, real estate investment trust funds, and other types of objective measures.

Portion 630 enables a consumer to determine the weighting of the selected objective valuation measures. According to an embodiment of the invention, a consumer may create a structured note based on more that one objective valuation measure. For example, a consumer could have 75% of the structured note based on a specific mutual fund and 25% on a specific bond fund. Other weightings and objective measure could also be used. If a consumer elects to explore the potential for a structured note based on more than one objective measure, an option may be presented to permit the user to select additional objective valuation measures. According to an embodiment of the invention, the weighting of the structured note may be greater than or less than 100%, depending upon the selections of the purchaser. By using leverage, taking a short position, taking a long position, etc., a purchaser can alter the investment and the weighting. Use of the structured note obviates the need by obligors to make margin calls related to leveraged or short positions.

Portion 635 enables a user to select the time period for the structured note. According to an embodiment of the invention, an obligor may offer a structured note for a particular time period. In exchange, the obligor may offer superior returns. For example, if a consumer purchases a structured note for a specific time period, e.g., eighteen month, two years, five years, etc., the obligor may offer a better rate of return, e.g., a return of one percent above the selected objective valuation measurement.

Portion 640 enables a user to select the valuation history time frame. A user may select any time period, e.g., one year, five years, since the inception of the fund, etc., upon which to evaluate the potential for future expectations. For example, if a user wants to purchase a structured note for five years, it may be desirable to base historical returns on the performance of the underling objective valuation measure for the past five years.

Portion 645 displays the historical return based on the selections made by the consumer while portion 650 displays the price of the structured note based on the selection.

Figure 7:
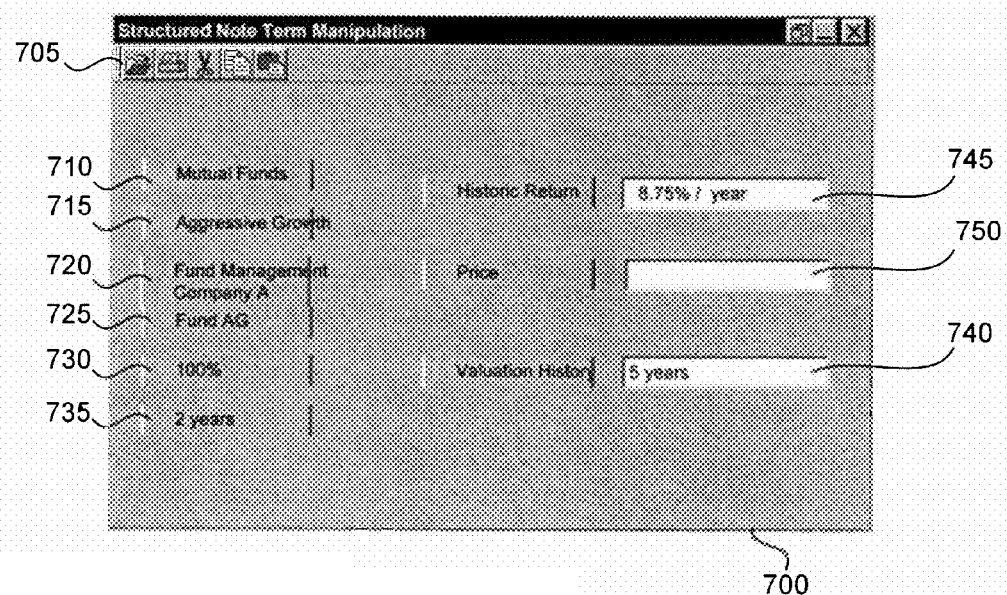
FIG. 7 illustrates a graphic user interface displaying the output of manipulated terms according to an embodiment of the invention.

FIG. 7 illustrates a graphical user interface displaying the output of manipulated terms according to an embodiment of the invention. As described above, graphical user interface 700 includes a standard menu 705 that enables a user to navigate within the website. In the example illustrated in FIG. 7, portion 710 displays that the user selected "Mutual Funds." Portion 715 shows that the user has selected the "Aggressive Growth" sector.

Portion 720 displays that the user selected "Fund Management Company A," while portion 725 displays that the user selected "Fund AG." Portion 730 discloses that the user desires a structured note based 100% on the selected fund. Portion 735 displays that the user selected a two year structured note. Further, the user selected a valuation history of five years as displayed in portion 740.

Portion 745 displays the historical return based on the selections made by the consumer while portion 750 displays the price of the structured note based on the selection. In the example illustrated in FIG. 7, the historical return is calculated to be 8.75% per year while the price is the amount to be paid by the purchaser. According to an embodiment of the invention, purchasing a structured note may be similar to purchasing a conventional bond, where the initial price does not change but the return or the structural changes based on attributes selected do change. Further, investments in a structured note may be "priced" based on a commitment by the purchaser. Thus, a purchaser may commit to a periodic investment (e.g., a monthly investment of $100) to purchase the structured note. The purchaser may then be given the structured notes immediately, with the pricing occurring based on the net present value of the future payments. Alternatively, individual structured notes may be purchased at the time a purchaser decides to make the investment.

At step 210, a request for one or more structured notes is received. A request may include one or more terms for the structured note. By way of example, terms may include the timing for redeeming the structured note, the amount or amounts of payments to be made, the basis for the valuation of the structured note and the basis for the performance of the structured note. Other terms for a structured note may also be used.

According to an embodiment of the invention, the valuation of a structured note may be based on an objective valuation. Objective valuations may include, but are not limited to, a stock price, commodity price, an economic index, a mutual fund, a stock market index, a bond fund, a bond index, an inflation index, a hedge fund, an interest rate, etc. Standard valuations, such as a mutual fund, are comprised of a bundle of attributes. Because of its pass-through structure, all investors must be treated the same, i.e. the bundle is not optimal for any investor. A structured note permits characteristics to be unbundled and customized to fit the exact needs of each investor on the basis of the terms of the structured note.

The identity of the owner of the structured note may also be considered part of the terms of the structured note. The request for the structure note may come directly from the owner, or may be made by a third party on behalf of the owner. Further, the owner may be an individual investor, a trust for an individual, an entity, or anyone else interested in an investment product.

At step 220, the request is processed. Processing may include reviewing the terms of the request and determining whether the terms are acceptable and appropriate. By way of example, processing may involve the obligor ensuring that the objective valuation measure is appropriate and that the time period for investment is appropriate for the rate of return requested. Other types of processing may also be used At step 230, one or more structured notes are generated. At step 240, a unique identifier for the structured note is generated. According to an embodiment of the invention, each structured note has a corresponding unique identification (e.g., numeric, alpha-numeric, etc.) that is unique to that structure note. Other manners of identification may also be used. Thus, for each structured note, an identification is provided. According to an embodiment of the invention, a structured note may be treated in a manner similar to a conventional mutual fund, where the unique identifier acts as an account number. Periodic updates, e.g., monthly, of the valuation of the structured note may be sent to the owner. Further, for marketing purposes, it may be desirable to include the actual return of the objective valuation measure and a contrast with the return of the structured note. Other information may also be included with a periodic update.

The identification of the owner of the structured note and the unique identifier are stored at step 250. According to an embodiment of the invention, the identification of the owner and the unique identifier may be stored within a database on a data storage module. The identification of the owner and the unique identifier may also be associated within the database. Thus, the database may be accessed to retrieve various information about the structured note, including the owner, the purchaser, the terms of the structured note, and the valuation of the structured note.

At step 260, payment is received for the purchase of the structured note. Payment may be received by any manner, such as by receipt of cash, check, or wire transfer. According to an embodiment of the invention, the amount of payment for the purchase is based on the objective valuation measure at the time of purchase. By way of example only, if one of the terms of the structured note is that the objective valuation measure is based on a particular publicly traded bond mutual fund, then the purchase is based on the valuation of that particular bond mutual fund on the day of the purchase of the structured note.

At step 270, the terms of the structured note and the purchase amount are stored. According to an embodiment of the invention, the terms of the structured note and the purchase amount may be stored within a database on a data storage module. The identification of the owner and the unique identifier may also be associated within the database. Thus, the database may be accessed to retrieve various information about the structured note, including the owner, the purchaser, the terms of the structured note, and the valuation of the structured note.

At step 280, an issuance confirmation occurs. According to an embodiment of the invention, issuance confirmation may include ensuring that a broker and/or purchaser receive a notification of the purchase of the investment. The notification may include a document having information about the structured note purchase, the purchase amount, the name of the purchase and the like. The document may be transmitted via mail, email, fax, or other manner of transmission. Upon receipt of the issuance confirmation, the purchaser and/or the broker may be required to approve the purchase. According to an embodiment of the invention, the broker and/or purchaser may be given a certain period of time within which to reject the transaction (e.g., twenty-four hours, within two days of the purchase, etc.). If no rejection is received by the obligor within the specified time period, the transaction is considered approved. When the document is transmitted electronically, various electronic tools, such as electronic signatures, may be used to for transmission, rejection, and/or approval of the transaction.

At step 285, the unique identifier, the purchaser name, the terms of the structured note and the purchase amount are linked together. Thus, the database may be accessed to retrieve various information about the structured note, including the owner, the purchaser, the terms of the structured note, and the valuation of the structured note at any time. Other associations may also be used to enable appropriate information to be retrieved as needed, such as all structured notes associated with one owner, or all the owners of a particular structured note. Other information may also be obtained.

At step 290, the structured note is issued. The issuance of the structured note may take any form, such as an account having periodic updates, a certificate (e.g., akin to a stock certificate) or other manner of issuing. At step 295, post issuance actions occur.

Actions that occur after the issuance of the structured note may include changing objective valuation measurements by the investor, altering the weighting of objective valuation measurements and communicating the status of the structured note. The status of the structured note may comprise the returns to date associated with the structured note, the current value of the structured note, the return of the underlying objective valuation measure, the difference between the value and/or return of the structured note and the underlying objective valuation measure and tax benefits.

Figure 8:
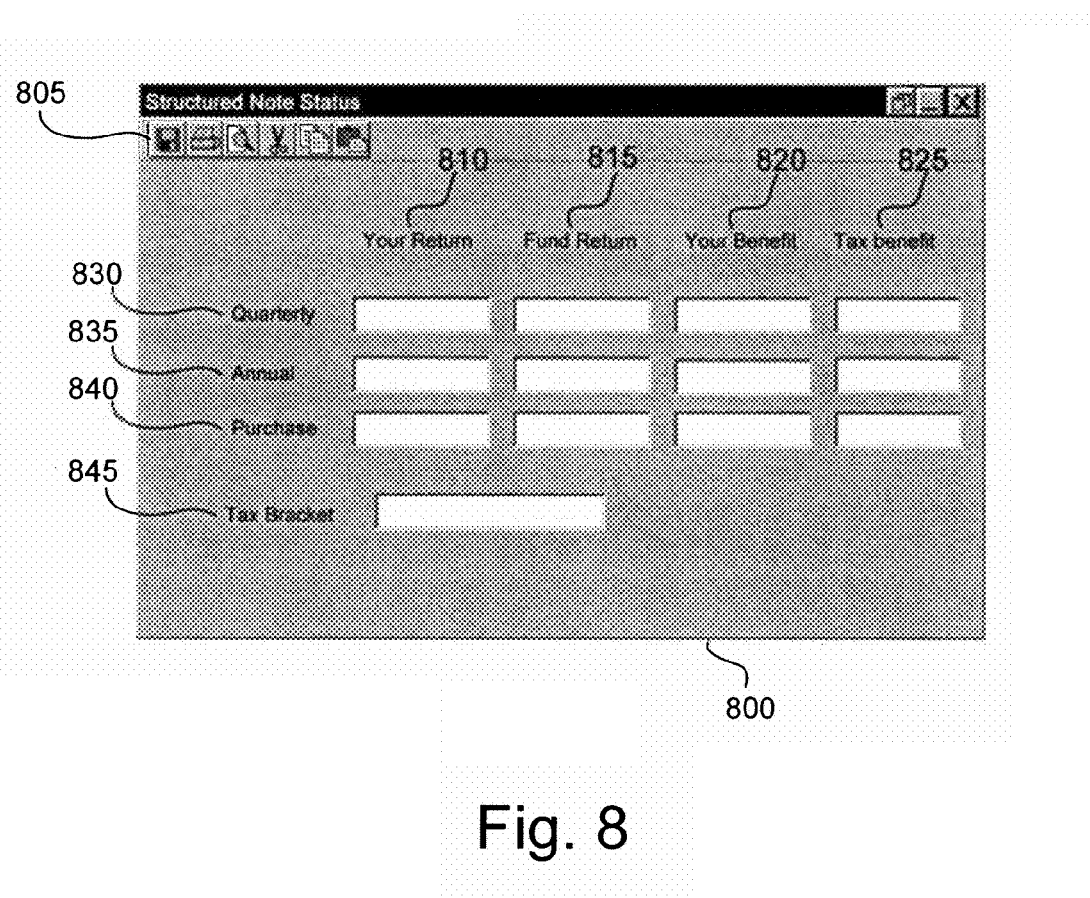
FIG. 8 illustrates a graphic user interface displaying a report of the status of a structured note to the owner according to an embodiment of the invention.

Communication of the status of the structured note to the owner may be performed in a variety of manners. For example, the status may be communicated via a period statement to the structured note holder via mail, e.g., monthly, quarterly, yearly, etc. The status may also be communicated electronically, such as via email, or via an owner accessing an internet site. FIG. 8 illustrates a graphical user interface displaying a report of the status of a structured note to the owner according to an embodiment of the invention. Graphical user interface 800 includes a standard menu 805 that enables a user to navigate within the website.

Portion 810 represents the return of the structured note for the owner. For purposes of comparison, graphical user interface 800 further provides the actual return of the underlying objective valuation measurement in portion 815, the benefit to the structured note holder in portion 820, and the tax benefit to the structured note holder in portion 825. In the example illustrated in FIG. 8, portion 830 displays the information from the past quarter, portion 835 displays the information from the past year, and portion 840 displays the information from the date of the purchase of the structured note. Additional information may also be displayed, such as forecasts for the structured note based on historic or estimated future returns over a given time period.

Further, in the example illustrated in FIG. 8, a user may select the appropriate tax bracket for that user. Thus, the tax benefit of portion 825 may be altered based on the selection in portion 845. According to an embodiment of the invention, portion 845 may provide a drop down menu having a list from which a user can select the appropriate tax bracket. Other manners for selecting the tax burden, such as selecting either long term or short term capital gains, may also be used.

In addition, comparisons between the return of the structured note and the return of the underlying objective valuation measurement and the tax benefits may be provided in a number of manners. An owner may select to have the comparison made in percentage terms or absolute dollar terms.

Figure 3:
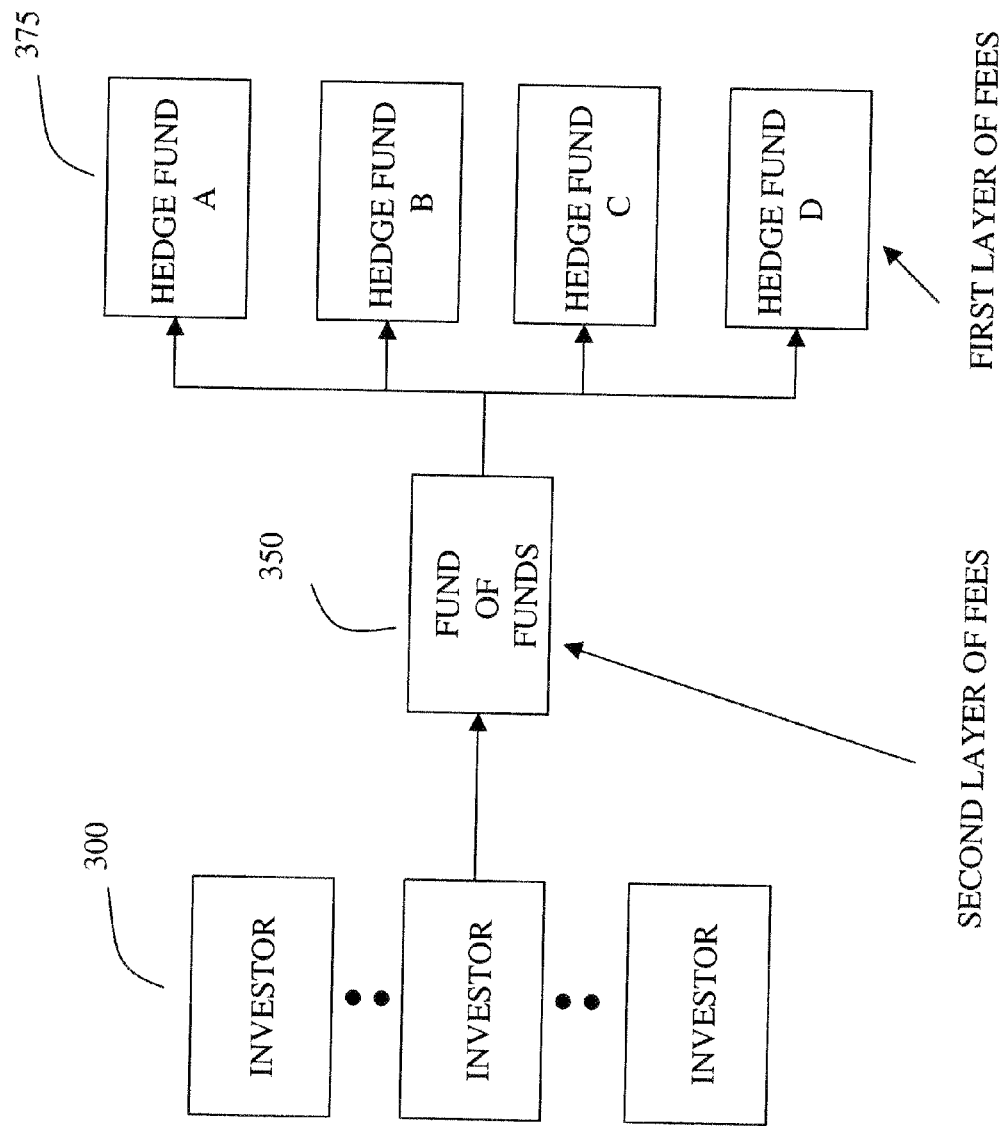
FIG. 3 illustrates a conventional funds-of-funds where the underlying assets are hedge funds according to an embodiment of the invention.

FIG. 3 illustrates a conventional funds-of-funds where the underlying assets are hedge funds according to an embodiment of the invention. In FIG. 3, a plurality of investors 300 are permitted to invest in the fund-of-hedge funds 350. Fund-of-funds 350 is managed by a fund manager who manages the plurality of hedge funds 375. A first level of fees are charged by the funds managers managing the individual funds 375. A second level of fees are charged by the funds manager managing the fund-of-funds 350. Thus, it can readily be appreciated that there are two levels of fees (performance fees and/or management fees) that are imposed in such a conventional fund-of-funds structure.

An alternative, and improved, way to enter the fund-of-funds market is to create a synthetic fund-of-funds according to the present invention. According to an embodiment of the invention, an investment vehicle superior to any institutional fund-of-funds offering on the market is to offer a structured note linked to a specific fund of funds but with a higher return that synthetically will provide a higher total return as a customized fund-of-hedge-funds. Customers then may be able to combine existing hedge funds and/or fund-of-funds to suit their particular needs. A customer may customize a fund of funds by adding or deleting underlying funds. By way of example, a fund of fund contains underlying funds 1 through 10. A customer may examine various permutations of structured notes, such as a structured note with only underlying funds 1-5 and 7-10, or a structured note with underlying funds 2-10. Other permutations may also be explored before the customer purchases the structured note.

Structured notes are hybrid securities, having features that may include: equity, commodities, straight debt instruments, etc., as well as derivative instruments. Interest payments on structured notes can be paid according to returns of various indexes or rates, in this case the performance of the underlying hedge funds in the fund-of-funds composition selected by the investor. In addition to interest paid on the structured note, the redemption value and final maturity of the note can be affected by the derivatives embedded in the structured note (here again the underlying hedge funds).

Figure 4:
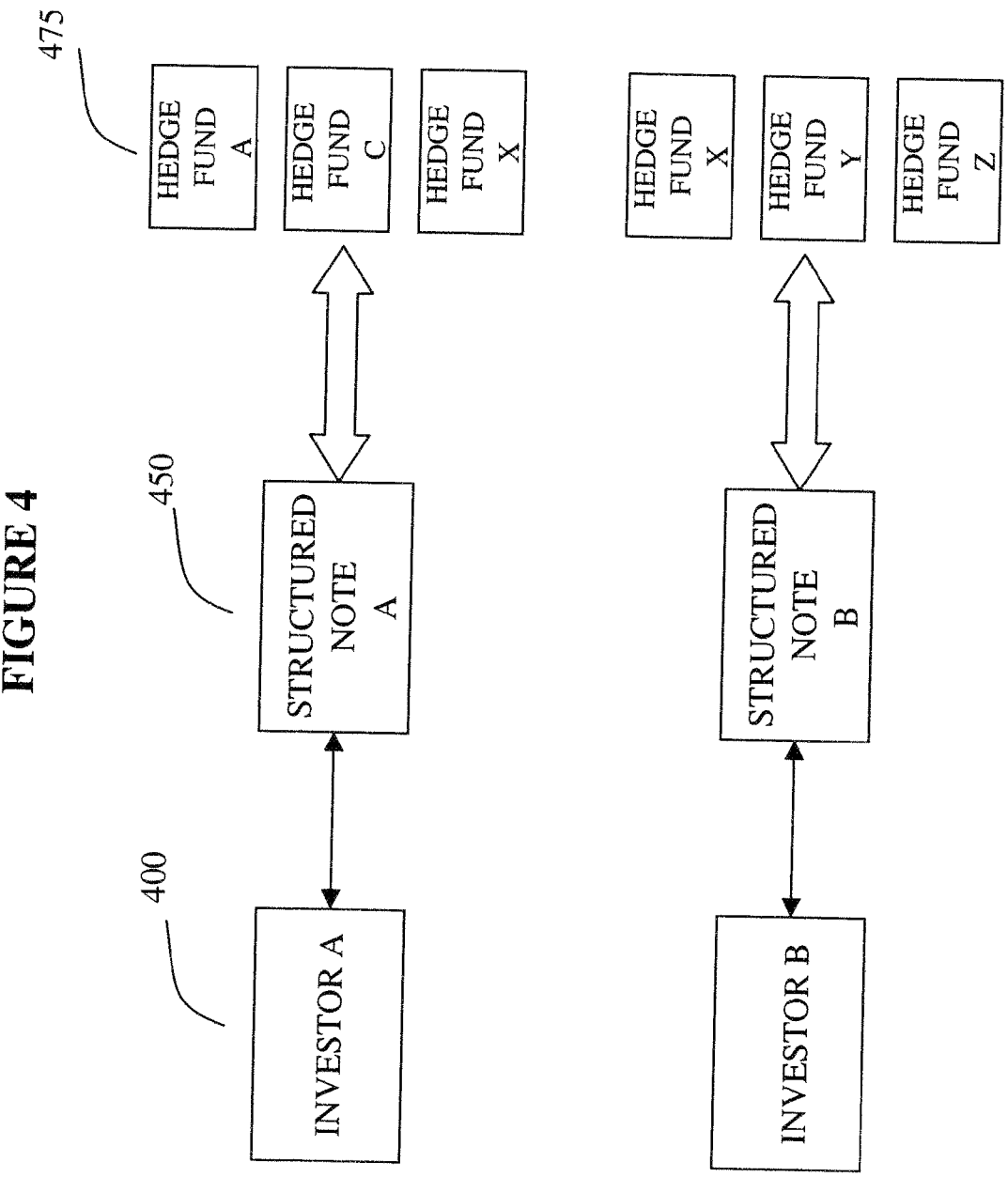
FIG. 4 illustrates an embodiment of the synthetic fund-of-funds according to an embodiment of the invention.

FIG. 4 illustrates an embodiment of the synthetic fund-of-funds according to an embodiment of the invention. Rather than investing directly into a fund-of-funds managed by a fund-of-funds manager, investors 400 would select their own fund-of-funds composition 475. For example, investor A 400 may select fund-of-funds composition 475 comprising hedge fund A, hedge fund C, and hedge fund X. Investor B 400 might select a fund-of-funds composition 475 comprising hedge fund X, hedge fund Y, and hedge fund Z. Accordingly, the synthetic fund-of-funds issuer would issue to investor A 400 a structured note A 450 structured to provide the performance of investor A's selected fund-of-funds 475 composition, whereas investor B 400 is issued a structured note B 450 structured to provide the performance of investor B's selected fund-of-funds composition 475.

While FIG. 4 illustrates the concept in terms of a fund-of-hedge funds, it should be understood that the concept of issuing structured notes as synthetic fund-of-funds could be applied based on underlying assets, long or short, leveraged or not, of nearly any form: hedge funds, mutual funds, individual equities, bonds, commodities, multiple fund-of-funds (the structured note corresponding to a synthetic fund-of-multiple-fund-of-funds) and so forth. The issuer, or obligor, issues structured notes that function as a synthetic fund-of-funds providing the investor the performance corresponding to the customized fund-of-funds without requiring corresponding purchase by the obligor of those identical funds.

By offering the performance of customized fund-of-funds to individual investors, the obligor may earn fees associated with fund-of-funds while enjoying a reduced risk more commensurate with the broader market by virtue of the diversity and size of the overall asset collection maintained by the obligor. This may be accomplished because the obligor is able to manage the assets differently from the way in which the conventional fund-of-funds manager manages its assets. According to one embodiment of the invention, the obligor offers the performance of a customized fund-of-funds without actually acquiring a direct interest in those underlying funds. Therefore, the obligor does not pay the costs (e.g., performance fees and management fees) associated with the first layer of managers for the individual funds.

According to an embodiment of the invention, obligor may short the performance of the customized fund-of-funds using structured notes, and separately buy and manage assets different from the underlying assets (e.g., the customized fund-of-funds) sold. While it initially may appear counterintuitive, this intentional asset/liability mismatch may have several benefits. Accordingly, one benefit may be that the obligor would not need to buy an established fund-of-funds company in order to offer a few seasoned performers. Instead, the obligor could offer its customers assets, in the form of the structured notes, matching exactly the performance of any fund of funds for which obligor can obtain data. According to an embodiment of the invention, this is likely to be a richer choice than any other single institution can offer since any single institution is unlikely to be able to invest in every fund-of-funds in existence.

Another benefit may be that obligor may offer its customers the ability to customize their exposures in ways not available elsewhere. Obligor's customers could be permitted to buy the performance of a well regarded fund-of-funds, and then modify the composition by adding and subtracting individual fund exposures, hedge funds, indices, stocks, etc. By way of example, an investor might select a structured note based on a particular fund of funds, and include a short or long position in specific hedge funds. In this way, investors can under- or over-weight individual funds or hedge fund strategies. Similarly, with mutual funds, stock positions can be over or under weighted. Because such customization does not require any actual transactions in the underlying assets, such changes conceivably could be made dynamically through time.

A further benefit may provide that investors may have the ability not only to customize the content of the synthetic fund, but additionally (or instead) the ability to customize the strategy employed. For example, the investor may favor the prospects of a particular fund-of-funds XYZ, but may be less enthusiastic for the prospects of employing a pairs trading strategy for the foreseeable future. The obligor may offer the performance of the fund-of-funds XYZ as customized to remove pairs trading.

Further, instead of simply earning a small distribution spread as a reseller of funds, obligor may capture the full amount of various layers of fees (e.g., the hedge fund manager's fees, the fund-of-fund manager's fees, etc.). Because the obligor, the issuer of the structured notes providing investors the performance of customized fund-of-funds, is not actually acquiring interests in the underlying funds, management fees may be avoided. This may allow the obligor to receive the various layers of fees or to discount fees for investors.

According to an embodiment of the invention, options otherwise not feasible or not permitted in conventional investments may be supported. By way of example, an investor can structure its structured note to place caps on losses/gains. In this manner, note holders would have the ability to shape their risk profile in the way that best suits them. For example, an investor willing to accept a maximum return of 10% over the term of the structured note, would be entitled to an incremental return. An investor with a specific liquidity requirement (e.g. college tuition), might choose principal protection with the specific term and amount he needs. While the result of principal protection will be to reduce the return of the structured note, it will substantially increase the investor's certainty.

While negotiating the structured note, investors may require an early redemption option, or the right periodically to reallocate their investment exposures. Without regard to fund restrictions, obligors can accommodate such investor desires. Fund management groups frequently allow periodic 'free exchanges,' shifting by investors their exposures, from one fund to another, within a single fund family at no cost, e.g. investing the proceeds of an equity growth fund into an equity income fund. At small risk/cost, obligors will be able to offer 'free exchanges' across multiple fund management groups.

Implementation of the synthetic fund using the present invention may be feasible for a larger financial institution with large balance sheets that may choose to own assets that are different from their liabilities, in this case the structured fund-of-funds notes it sells. Such larger institutions need not simply match assets and liabilities, as may be required by smaller entities such as fund-of-funds groups or mutual fund management companies. Therefore, the structured notes need not match or correspond to the assets.

The issue of the risk to the issuer of having mismatched assets and liabilities may be dealt with across the aggregate valuation of the structured notes issued by the obligor. With enough investors, and very lightweight controls, the overall returns of the structured notes should closely track the general market for fund-of-funds. The S&P is in the process of establishing a hedge fund index, using 40 funds as a proxy for the 6,000 funds currently in the market. The New York Times wrote "Standard & Poor's says its statistical research shows that 30 to 40 funds reliably reporting their performance data can accurately represent a much larger universe." Therefore, whether the right number is 40 or 200, the obligor may assure its structured note exposure represents the general fund-of-funds market, without undue concentration to particular names that might substantially exceed average returns.

According to an embodiment of the invention, the obligor may choose to invest structured note proceeds (e.g., the moneys paid by the investors to acquire structured notes corresponding to their customized fund-of-funds) in funds that mimic or simulate the exposures of the structured notes. This strategy would be very successful if obligor asset managers continued to beat the market. If the obligor managers just matched market performance, obligor may still earn the full fees. In addition, if the obligor is a sufficiently large company, such as a large financial institution, the obligor may use its wholesale buying power to gain access to the most attractive funds and to negotiate reduced fees.

On the issue of risk, different fund strategies perform differently over time. However, within categories of strategies (e.g., pairs trading, convertibles, risk arbitrage, etc.), performance among fund managers and funds is generally pretty similar. A substantial amount of basis risk may be eliminated if the obligor invests in fund strategies on parity with the structured notes chosen by note holders. Therefore, although the liabilities and assets will be mismatched, strictly speaking the respective performances should be about the same, thus minimizing risk to the obligor.

There may be another attractive aspect for the obligor in selling fund-of-funds structured notes (e.g., synthetic hedge funds). Typically, hedge funds investors can "cash out" (liquidate their positions) within 90 days, while structured notes usually have multi-year terms. Some hedge funds will make fee concessions if funds are committed for a fixed term, e.g., 3-5 years. Therefore, the longer terms of the structured notes may allow the obligor to reduce the costs of acquiring corresponding assets in hedge funds.

Of course, dependable and accurate information is important to the success of the synthetic fund instrument. To offer synthetic funds may require detailed performance information. In some instances, such information is not always readily available. As discussed previously, hedge funds are usually structured as limited partnerships and generally are not required to publicly report their performance. Notwithstanding, there are ways by which the obligor can gain access to sufficiently accurate performance information in order to successfully offer the synthetic fund-of-funds.

Offering of a synthetic fund may provide good returns to an obligor. Selling what the market wants to buy is the lowest cost means of distribution. Fund-of-funds and actively managed funds charge relatively high fees. These fees are on top of fees paid to hedge fund managers. Therefore, offering structured notes should be lucrative.

Structured notes may also provide a wonderful opportunity to provide customers access to a rich array of premium products, while at the same time allowing obligors to retain much or all of the management fees. With only one level of distribution, obligors may offer the performance of prominent fund-of-funds at discounted fees.

As general structured notes are already well understood and accepted by investors, such structured notes of the present invention should not be resisted by the investment community. In addition to being well understood, structured notes may provide some benefits not available in the more ordinary fund-of-funds investments. Particularly in Europe and Asia, there is a large appetite for principal protected notes that offer most of the investment characteristics of alternative investments.

Sometimes investor preference for such structured notes is related to regulatory arbitrage. Several portfolios of private equity participations have been sold using principal protected notes. Buyers limited by the size of their alternative investment baskets were able to obtain an upside similar to private equity. These notes carried a term of 15-years and a AAA guarantee of the principal. Some regulated investors simply booked the notes as if they were AAA debt, though without a coupon, the guarantee is worth less than half the original investment.

Also, structured notes may permit additional flexibility in offering investors customized risk/rewards structures. Since there is no commodity market for such offerings, and no current price competition, this too could be an attractive business.

In principal, an obligor could offer exposures to every public mutual fund, as well as every listed security, index, commodity price, etc. Investors could combine a number of different equity exposures in a single structured note, or have a series of structured notes. Investors may choose to leverage their equity exposure up to a maximum established by the obligor. In a single structured note, an investor could choose to take long exposures to some funds, and short the performance of other funds.

Some mutual funds have been launched based on a strategy of capital preservation. Options traders recognize this strategy as 'delta hedging,' an attempt to simulate a put option by constantly adjusting the cash/equity mix. In volatile markets, this strategy can be extremely costly. The strategy's efficacy is uncertain, and depends on market liquidity during times when markets are inherently illiquid. During the 1987 stock market collapse, 'delta hedging' was blamed for a substantial portion of the sell side pressure.

Capital preservation is generally not considered a great strategy for mutual funds. Mutual fund managers typically do not buy option protection, and are not well positioned to manage short-options positions. There are substantial scale economies to managing option books. Delta hedging requires lots of trading, and transaction costs (bid/asked spreads) for most mutual funds are high. In addition, each investor has a different view of the term of investment and amount of capital he or she would like to preserve. Inherently, the fund manager cannot optimize for each investor, nor can he make clear to investors the cost or efficacy of the protection on offer. By contrast, an obligor can offer principal protection customized to the needs of each structured note holder, reliant only on the credit of the obligor.

Puts and calls with the same strike and teem are priced using the same volatility assumptions. However, in some cases people's behavior, choices and judgments may be impossible to reconcile with a rational model. For example, one systemic human bias is that that losses loom larger than gains. Studies of equity risk premium have concluded that losses hurt roughly 2.25 times more than gains satisfy. Under such circumstances, one would expect retail investors would value the ability efficiently to reduce their downside exposures.

Institutional investors frequently take advantage of risk/return shaping that so far has been unavailable to individuals. During the bull market, many institutions bought 'costless collars,' that protected a portion of their gains, while funding the cost (long a put option) by forgoing a portion of potential additional upside (short a call option). Such strategies for individual stocks would be quite costly for individuals, and currently completely unavailable for mutual funds.

Tax consequences of gains recognized by mutual funds are passed through to shareholders. Shareholders in mutual funds generally have little notion of their potential tax liability connected with unrealized fund gains. In addition, the timing of tax liabilities is completely unpredictable. Fund realization of taxable gains can inflict substantial, uneven and inequitable penalties on different shareholders. An investor who held a fund for a short time during which the manager chose to realize large gains may still be liable for the tax consequences.

Structured notes will be capital assets. Unlike mutual funds, there will be no pass-through of tax liabilities. Note holders will not face unpredictable tax consequences. However, structured note holders will incur ordinary income for structured note coupons (e.g., direct or OID), and coupon income may exceed dividend income from the underlying stock positions.

Mutual funds offer every investor the same liquidity. Issuers of structured notes can offer different liquidity provisions to each investor, at prices that reflect the economic value of the liquidity. Investors could select different redemptions/call/term options, e.g., a fixed term note, redeemable after one year, once a week, at various redemption discounts, callable at a premium, extension options, either by the obligor or the investor, etc. Obligors might be happy to offer investors with a three-year investment horizon higher returns than offered to short-term investors.

Structured note holders may also individually choose the manner by which they want to take their structured note returns. Some will choose to maximize potential long-term capital gains. Others may seek periodic fixed, or variable (e.g., linked to short-term interest rates, or capital gains) payments. The structure of structured note cash flow can be extremely flexible.

One example of a manner in which a structured note according to the present invention may be implemented is set forth below in the example of Sample Note #1. The structured note links to the performance of the Fidelity Magellan Fund, with a principal amount of $20,000. The structured note closes on Dec. 15, 2002, and the final note payment occurs on the earliest of (i) three years from the date of closing; (ii) five days following early redemption by the investor; or (iii) five days after the selected mutual fund ceases to be a mutual fund. The structured note pays two percent semi-annually, paid on a 30/360 basis. On the final structured note payment date, the obligor will pay the amount that will provide the investor a yield equal to the greater of (i) 50 basis points more than the yield of the selected mutual fund; or (ii) 105% of the yield of the selected mutual fund, which in this example is the Fidelity Magellan Fund (currently closed to new investors). Early Redemption is permitted on the first date following receipt by the obligor of effective written notice by the investor, after the first anniversary of the closing. The semi-annual internal-rate-of-return, using standard methods, is calculated: (i) for the selected mutual fund—taking account for all cash flows the investor would have received had he or she made an investment of the principal amount in the selected mutual fund during the term of the structured note, and received the final NAV on the final payment date; (ii) for the structured note—taking account for all coupons received during the term of the structured note, and the amount paid on the final structured note payment date. The final NAV is the arithmetic average of the last four reported NAV calculations, prior to the final structured note payment date.

Another example of a manner in which a structured note according to the present invention may be implemented is set forth below in the example of Sample Note #2. The structured note links to the Fidelity Magellan Fund, with a principal amount of $20,000 and a closing date of Dec. 15, 2002. The final structured note payment date is Dec. 15, 2005. On the final note payment date, the obligor will pay the amount that will provide the investor with a yield equal to the greater of: (i) 20 basis points less than the yield of the selected mutual fund; or (ii) the protected principal amount, where the protected principal amount is $18,000. The mutual fund is any actively managed, publicly traded, open-ended mutual fund, which in this case is the Fidelity Magellan Fund (currently closed to new investors). The yield is the semi-annual internal-rate-of-return calculated: (i) for the selected mutual fund—taking account for all cash flows the investor would have received had he made an investment of the principal amount in the selected mutual fund during the term of the structured note, and received the final NAV on the final payment date; (ii) for the structured note—taking account for all coupons received during the term of the structured note, and the amount paid on the final structured note payment date.

The final NAV is the arithmetic average of the last four reported NAV calculations, prior to the final structured note payment date.

One example of a manner in which a structured note according to the present invention may be implemented is set forth below in the example of Sample Note #3. The structured note links to the Fidelity Magellan Fund. The principal amount is $20,000. The closing date is Dec. 15, 2002, and the final note payment date is Dec. 15, 2005. On the final structured note payment date, the obligor will pay the amount that will provide investor a yield equal to: (i) 40 basis points more than the yield of the selected mutual fund; but, (ii) not less than the protected principal amount, where the protected principal amount is $18,000; and (iii) not more than $23,000. The semi-annual internal-rate-of-return is calculated: (i) for the selected mutual fund—taking account for all cash flows the investor would have received had he made an investment of the principal amount in the selected mutual fund during the term of the structured note, and received the final NAV on the final payment date; (ii) for the structured note—taking account for all coupons received during the term of the structured note, and the amount paid on the final structured note payment date. The final NAV is the arithmetic average of the last four reported NAV calculations, prior to the final structured note payment date.

A further example of a manner in which a structured note according to the present invention may be implemented is set forth below in the example of Sample Note #4. The structured note links to a selected mutual fund portfolio. In this example, that comprises a long position of $30,000 on the Fidelity Magellan Fund and a short position of $20,000 on the Fidelity Emerging Markets Fund. The principal amount is for $20,000, with a closing date of Dec. 15, 2002, and a final structured note payment date of the earliest of: (i) three years from the date of closing; (ii) five days following early redemption by the investor; or (iii) five days after any of the mutual funds in selected mutual fund portfolio ceases to be a mutual fund. On the final structured note payment date, the obligor will pay the sum of: (i) the principal amount; (ii) 1% interest on the principal amount; plus, (iii) the final NAV of the selected mutual fund portfolio, less the NAV of the selected mutual fund portfolio on the closing date. Early redemption is the first date following receipt by the obligor of effective written notice by the investor, after the first anniversary of the closing. Final NAV is the arithmetic average of the last four reported NAV calculations, prior to the final note payment date.

Figure 5:
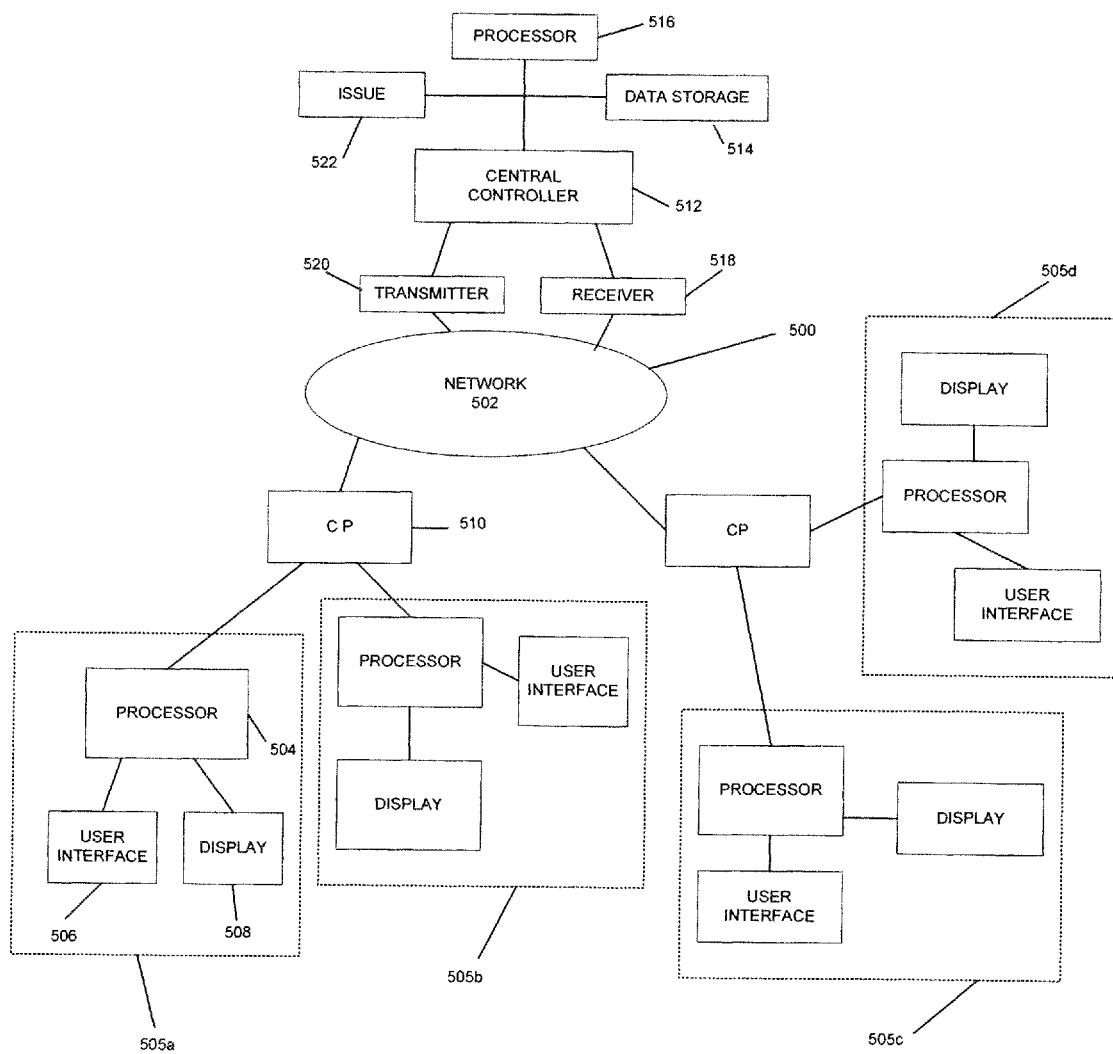
FIG. 5 illustrates a system for implementing a synthetic fund having one or more structured notes according to an embodiment of the invention.

FIG. 5 illustrates a system 500 according to an embodiment of the present invention. The system 500 comprises a plurality of computer devices 505 (or "computers") used by a plurality of users to connect to a network 502 through a plurality of connection providers (CPs) 510. The network 502 may be any network that permits multiple computers to connect and interact. According to an embodiment of the invention, the network 502 may be comprised of a dedicated line to connect the plurality of the users, such as the Internet, an intranet, a local area network (LAN), a wide area network (WAN), a wireless network, or other type of network. Each of the CPs 510 may be a provider that connects the users to the network 502. For example, the CP 510 may be an Internet service provider (ISP), a dial-up access means, such as a modem, or other manner of connecting to the network 502. In actual practice, there may be significantly more users connected to the system 500 than shown in FIG. 5. This would mean that there would be additional users who are connected through the same CPs 510 shown or through another CP 510. Nevertheless, for purposes of illustration, the discussion will presume four computer devices 505a-505d are connected to the network 502 through two CPs 510.

According to an embodiment of the invention, the computer devices 505a-505d may each make use of any device (e.g., a computer, a wireless telephone, a personal digital assistant, etc.) capable of accessing the network 502 through the CP 510. Alternatively, some or all of the computer devices 505a-505d may access the network 502 through a direct connection, such as a T1 line, or similar connection. FIG. 5 shows the three computer devices 505a-505d, each having a connection to the network 502 through the CP 510a and the CP 510b. The computer devices 505a-505d may each make use of a personal computer such as a computer located in a user's home, or may use other devices which allow the user to access and interact with others on the network 502. A central controller module 512 may also have a connection to the network 502 as described above. The central controller module 512 may communicate with one or more modules, such as one or more data storage modules 514, one or more processor modules 516, or other modules.

Each of the computer devices 505a-505d used may contain a processor module 504, a display module 508, and a user interface module 506. Each of the computer devices 505a-505d may have at least one user interface module 506 for interacting and controlling the computer. The user interface module 506 may be comprised of one or more of a keyboard, a joystick, a touchpad, a mouse, a scanner or any similar device or combination of devices. Each of the computers 505a-505d may also include a display module 508, such as a CRT display or other device. According to an embodiment of the invention, a developer, a user of a production system, and/or a change management module may use a computer device 505.

The central controller module 512 may maintain a connection to the network 502 such as through a transmitter module 520 and a receiver module 518. The transmitter module 520 and the receiver module 518 may be comprised of conventional devices that enable the central controller module 512 to interact with the network 502. According to an embodiment of the invention, the transmitter module 520 and the receiver module 518 may be integral with the central controller module 512. According to another embodiment of the invention, the transmitter module 520 and the receiver module 518 may be portions of one connection device. The connection to the network 502 by the central controller module 512 and the computer devices 505 may be a high speed, large bandwidth connection, such as through a T1 or a T3 line, a cable connection, a telephone line connection, a DSL connection, or another similar type of connection. The central controller module 512 functions to permit the computer devices 505a-505c to interact with each other in connection with various applications, messaging services and other services which may be provided through the system 500.

The central controller module 512 preferably comprises either a single server computer or a plurality of server computers configured to appear to the computer devices 505a-505d as a single resource. The central controller module 512 communicates with a number of modules. Each module will now be described in greater detail.

A processor module 516 may be responsible for carrying out processing within the system 500. According to an embodiment of the invention, the processor module 518 may handle high-level processing, and may comprise a math co-processor or other processing devices.

Data may be stored in a data storage module 514. The data storage module 514 stores a plurality of digital files. According to an embodiment of the invention, a plurality of data storage modules 514 may be used and located on one or more data storage devices, where the data storage devices are combined or separate from the controller module 512. One or more data storage modules 514 may also be used to archive information.

Issue module 522 may issue structured notes and/or synthetic funds. Issuing may include forwarding a certificate and/or statement related to the structured note to the owner. A statement may be provided on a periodic basis, e.g., monthly, quarterly, etc. Statements may be provided electronically, such as via email or by providing a secure internet site for an owner of the structured note to access information. Further, as statements may be provided in hard copy form, e.g., a paper print-out of the structured note performance, issue module 522 may include, or have access to, equipment necessary to print out a statement.

While the system 500 of FIG. 5 discloses the requester device 505 connected to the network 502, it should be understood that a personal digital assistant ("PDA"), a mobile telephone, a television, or another device that permits access to the network 502 may be used to arrive at the system of the present invention. It is understood that, while system 500 is represented in FIG. 5 as a network based system, other systems may also be used, with applicable modules resident therein. Other systems may also be used.

According to an embodiment of the invention, the systems and processes described in this invention may be implemented on any general purpose computational device, either as a standalone application or applications, or even across several general purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one exemplary embodiment of the present invention, the system may comprise components of a software system. The system may operate on a network and may be connected to other systems sharing a common database. Other hardware arrangements may also be provided.

Currently, most individual investors execute their investment transactions through brokers. The fund management business provides enormous revenues for many brokerage companies. This invention will likely be viewed as competitive with ordinary funds management, and inimical to many brokerage businesses. Brokerage firms do not, in general, have substantial balance sheets, and therefore are unlikely to be large issuers of structured notes.

Brokers not restricted by funds management conflicts, and independent investment advisors are potential distribution forces for synthetic funds. However, to be successful, synthetic funds will require development of large alternative distribution channels. The sale of synthetic funds will also require substantial investor education.

The development of cash management accounts caused many individuals to remove their funds from bank savings accounts and establish, for the first time, accounts with brokerage firms. The consequence has been an enormous growth in the non-bank, brokerage and fund management industry. Today, banks represent a very small part of the consumer investment business.

One possible educational/advertising network for synthetic funds is a consortium of banks, or other financial institutions interested in issuing structured notes. From a distribution perspective issuers of structured notes, independent investment advisors, and other like minded parties could be organized to jointly develop and leverage educational materials, marketing, marketing collateral and advertising. Such groups could establish rules and standards that would inspire investor confidence, share the cost of advertising and promotions, share the costs of consumer education, etc.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of an invest product for consumers, it will be appreciated that variations and modifications can be effected by a person of ordinary skill in the art without departing from the scope of the invention. For example, one of ordinary skill in the art will recognize that certain investment processes and systems may be applied to other investment-oriented process in which valuation is not asset based. Furthermore, one of ordinary skill in the art will recognize that such processes and systems do not need to be restricted to structure notes.

The invention claimed is:

1. A computer-implemented method for forming a structured note, the structured note comprising a contract allowing an obligor to provide a return to an investor, the return based on at least one selectable objective valuation measure, the method comprising:
  identifying an investment goal through requestor interaction with a graphical user interface;
  implementing an optimization tool executed by computer processing components for generating a proposal for meeting the investment goal selected by the requestor, the proposal identifying multiple objective valuation measures;

customizing the structured note, using customization components executed by the computer processing components, by combining selected identified objective valuation measures as selected by the requestor to meet the investment objective;

issuing the structured note having the multiple objective valuation measures and meeting the investment objective, wherein underlying assets of the obligor are not identical to liabilities created by the objective valuation measures of the issued structured note.

2. The system according to claim 1, wherein the at least one selectable objective valuation measure references at least one of:

an actively managed fund; a mutual fund; a hedge fund; a private equity fund; a venture capital fund; a passively managed fund; an index fund; a market index; a stock market index; a generic market level; and a market instrument.

3. The method according to claim 1, wherein customizing comprises providing customization capabilities allowing customization of the objective valuation measures without a predetermined amount of fees associated with the customization of the objective valuation measure.

4. The method according to claim 1, wherein the structured note is defined by terms including a purchase amount and a time period for redeeming the structured note.

5. The method according to claim 1, further comprising basing obligor payment of an obligor structured note obligation on the selected objective valuation measures at the time of the payment.

6. The method according to claim 1, further comprising providing an interface allowing requestors to test the structured note to review performance over multiple historical time periods.

7. The method of claim 1, further comprising allowing the requester, through a graphical user interface, to model a change in a risk profile of the structured note resulting from increasing or decreasing exposure to the objective valuation measures.

8. The method of claim 1, further permitting requestors to: change a risk profile of at least one objective valuation measure; add objective valuation measures; and
customize liquidity access for at least one objective valuation measure.

9. The method of claim 1, further comprising providing a post-issuance addition and subtraction option enabling the requestor to add and subtract valuation measures after issuance of the structured note.

10. The method of claim 1, further comprising allowing requestors to implement the customization components to change weightings of the multiple objective valuation measures post issuance.

11. The method of claim 1, further comprising creating a liability and asset mismatch between structured note liabilities defined by the portfolio and offsetting hedge instruments, thus incurring increased risk, thereby enabling the investment return produced to exceed potential return achievable through direct exposure to the selected objective valuation measures.

12. A computer-implemented system for forming a structured note, the structured note comprising a contract allowing an obligor to provide a return to an investor, the return based on at least one selectable objective valuation measure, the system comprising:

a computer memory for storing data pertaining to the at least one selectable objective valuation measure; and computer processing components for executing software modules for performing steps including:

identifying an investment goal through requestor interaction with a graphical user interface;

implementing an optimization tool for generating a proposal for meeting the investment goal selected by the requestor, the proposal identifying structured note terms including multiple objective valuation measures;

customizing the structured note by combining the identified objective valuation measures as specified by the requestor to meet the investment objective; and issuing the structured note having the multiple objective valuation measures and meeting the investment objective, wherein underlying assets of the obligor are not identical to liabilities created by the objective valuation measures of the issued structured note.

13. The system of claim 12, further comprising a request module receiving a request from the requestor to purchase the structured note from the obligor, the structured note having an investment return based on terms of the structured note including the multiple objective valuation measures.

14. The system of claim 12, further comprising graphical user interfaces providing the requestor with customization options that customize exposure of the structured note, the customization options comprising, (a) an initial selection capability that receives an initial selection of the exposure to the multiple objective valuation measure from the requestor, the objective valuation measures selected from multiple objective valuation measures including both passive and active measures, and (b) a post-issuance capability that receives an alteration of the initial selection of the exposure from the requestor.

15. The system according to claim 12, where the selected objective valuation measures reference at least one of:

an actively managed fund; a mutual fund; a hedge fund; a private equity fund; a venture capital fund; a passively managed fund; an index fund; a market index; a stock market index; a generic market level; and a market instrument.

16. The system according to claim 12, wherein customization components provide customization capabilities allowing customization of the selected objective valuation measures without a predetermined amount of fees associated with the customization of the objective valuation measures.

17. The system according to claim 12, where terms of the structured note further comprise a valuation of the structured note; and where the valuation of the structured note is based in part on the time period for redeeming the structured note.

18. The system according to claim 12, where obligor payment of an obligor structured note obligation is based on the selected objective valuation measures at the time of the payment.

19. The system according to claim 12, wherein terms of the structured note further comprise a purchase amount and a time period for redeeming the structured note.

20. The system according to claim 12, further comprising an interface allowing requestors to test the structured note to review performance over multiple historical time periods.

21. The system of claim 12, further comprising allowing the requester, through a graphical user interface allowing the requestor to model a change in a risk profile of the structured note resulting from increasing or decreasing exposure to the objective valuation measures.

22. The system of claim 12, wherein the customization components further permit requestors to: change a risk profile of at least one objective valuation measure; add objective valuation measures; and customize liquidity access for at least one objective valuation measure.

23. The system of claim 12, wherein the customization components allow requestors to change weightings of the multiple objective valuation measures post issuance.

* * * * *